United States Patent
Dyer et al.

(10) Patent No.: US 8,966,503 B1
(45) Date of Patent: Feb. 24, 2015

(54) SYSTEM AND METHOD FOR CORRELATING ANOMALOUS EVENTS

(71) Applicant: Quest Software, Inc., Aliso Viejo, CA (US)

(72) Inventors: Kelly Noel Dyer, Toronto (CA); David McAleer, Toronto (CA); Omair-Inam Abdul-Matin, Whitby (CA)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 13/837,740

(22) Filed: Mar. 15, 2013

(51) Int. Cl.
  G06F 3/00 (2006.01)
  G06F 9/44 (2006.01)
  G06F 9/46 (2006.01)
  G06F 13/00 (2006.01)
  G06F 9/54 (2006.01)

(52) U.S. Cl.
  CPC ..................................... G06F 9/542 (2013.01)
  USPC .............................. 719/318; 726/22; 714/100

(58) Field of Classification Search
  None
  See application file for complete search history.

(56) References Cited

U.S. PATENT DOCUMENTS

| | | | |
|---|---|---|---|
| 7,100,095 B2 | 8/2006 | Godse et al. | |
| 7,559,065 B1 * | 7/2009 | Sosnovsky et al. | 719/318 |
| 7,941,809 B1 * | 5/2011 | Gordon et al. | 719/318 |
| 8,104,045 B1 * | 1/2012 | Yanosy, Jr. | 719/318 |
| 8,341,106 B1 | 12/2012 | Scolnicov et al. | |
| 2002/0152185 A1 | 10/2002 | Satish Jamadagni | |
| 2004/0117802 A1 * | 6/2004 | Green | 719/318 |
| 2005/0138642 A1 | 6/2005 | Breh et al. | |
| 2007/0245357 A1 | 10/2007 | Breiter et al. | |
| 2007/0289013 A1 * | 12/2007 | Lim | 726/22 |
| 2008/0198753 A1 * | 8/2008 | Choudhury et al. | 370/242 |
| 2009/0262650 A1 * | 10/2009 | Shaikh et al. | 370/242 |
| 2011/0054776 A1 * | 3/2011 | Petrov et al. | 701/201 |
| 2011/0131588 A1 * | 6/2011 | Allam et al. | 719/318 |
| 2012/0233326 A1 | 9/2012 | Shaffer et al. | |
| 2012/0278015 A1 | 11/2012 | Budhraja et al. | |
| 2013/0196685 A1 * | 8/2013 | Griff et al. | 455/456.1 |
| 2014/0067325 A1 * | 3/2014 | McKee et al. | 702/183 |

OTHER PUBLICATIONS

HP Operations Manager for UNIX 8.34, "MessageStorm Detection", 2009, (32 pages).
HP, "HP Operations Manager for UNIX: Correlation Techniques", 2008, (24 pages).

* cited by examiner

*Primary Examiner* — Diem Cao
(74) *Attorney, Agent, or Firm* — Winstead PC (57) ABSTRACT

The method includes monitoring a plurality of information handling systems. The method further includes receiving an anomalous event with respect to at least one information handling system of the plurality of information handling systems. In addition, the method includes performing, via at least one correlation handler, at least one correlation algorithm on the anomalous event. Further, the method includes, responsive to the performing, creating, via the correlation handler, at least one composite event. Additionally, the method includes sending the at least one composite event to an event handler. The method also includes issuing, via the event handler, an alert for the at least one composite event.

20 Claims, 5 Drawing Sheets

SYSTEM AND METHOD FOR CORRELATING ANOMALOUS EVENTS

BACKGROUND

1. Technical Field

The present invention relates generally to event monitoring and more particularly, but not by way of limitation, to systems and methods for correlating events.

2. History Of Related Art

Event-monitoring systems are typically configured to identify anomalous events and notify appropriate individuals by issuing an alert (i.e., a message) in the form of a voice alert, email, text message, etc. Oftentimes, however, anomalous events are merely a result of a much larger event that either already has occurred or is in the process of occurring. For example, a monitoring system may identify that a particular object is offline or experiencing difficulty. A root cause may be a technical problem on an object several levels above the particular object in a network topology. In such circumstances, the causing object and each object beneath the causing object in the network topology are typically the subject of discrete events that are identified by the event-monitoring system and for which alerts are issued. The result is a storm of messages, often to a same group of individuals, that relate to a same root cause.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes monitoring, by an event-monitoring system, a plurality of information handling systems. The method further includes receiving an anomalous event with respect to at least one information handling system of the plurality of information handling systems. In addition, the method includes performing, via at least one correlation handler on the event-monitoring system, at least one correlation algorithm on the anomalous event. Further, the method includes, responsive to the performing, creating, by the event-monitoring system via the correlation handler, at least one composite event. Additionally, the method includes sending the at least one composite event to an event handler. The method also includes issuing, by the event-monitoring system via the event handler, an alert for the at least one composite event.

In one embodiment, an information handling system is operable to perform a method. The method includes monitoring a plurality of information handling systems. The method further includes receiving an anomalous event with respect to at least one information handling system of the plurality of information handling systems. In addition, the method includes performing, via at least one correlation handler, at least one correlation algorithm on the anomalous event. Further, the method includes, responsive to the performing, creating, via the correlation handler, at least one composite event. Additionally, the method includes sending the at least one composite event to an event handler. The method also includes issuing, via the event handler, an alert for the at least one composite event.

In one embodiment, a computer-program product includes a computer-usable medium having computer-readable program code embodied therein. The computer-readable program code is adapted to be executed to implement a method. The method includes monitoring a plurality of information handling systems. The method further includes receiving an anomalous event with respect to at least one information handling system of the plurality of information handling systems. In addition, the method includes performing, via at least one correlation handler, at least one correlation algorithm on the anomalous event. Further, the method includes, responsive to the performing, creating, via the correlation handler, at least one composite event. Additionally, the method includes sending the at least one composite event to an event handler. The method also includes issuing, via the event handler, an alert for the at least one composite event.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, alerting of anomalous events can be made more effective via systems and methods described herein. In various embodiments, anomalous events are analyzed for root cause at a time of identification and before being passed to an event handler for issuing alerts. In a typical embodiment, anomalous events that have been inferred to relate to a same root cause can be correlated into a composite event that is passed to an appropriate event handler. In this fashion, alerts can be made more specific by indicating an inferred root cause. Alerts can also be targeted to a set of individuals who should be notified of the composite event regardless of whether those individuals would have been notified of any individual anomalous event. In addition, redundant alerts such as, for example, message storms, can be reduced or eliminated.

An anomalous event, as used herein, refers to a detected occurrence or action that deviates from what is expected and/or that merits special handling. For example, an anomalous event may be a detected deviation from expected performance on an information handling system. A composite event, as used herein, is a higher-order event made up of one or more anomalous events. For example, a composite event may result from two or more anomalous events being deemed to have a common root cause. The common root cause may be inferred, for example, from an analysis of the one or more anomalous events. A message or alert, as used herein, refers to a notification made via, for example, email, short message service (SMS) text message, voice communication, and the like. For example, in various embodiments, alerts regarding anomalous events and/or composite events may be issued to specific individuals or groups of individuals. Dynamic context information, as used herein, refers to variable characteristics of an information handling system and/or of the information handling system's environment. Such variable characteristics may be referenced herein as contextual variables. Dynamic context information that provides values for contextual variables may be referenced herein as contextual values.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
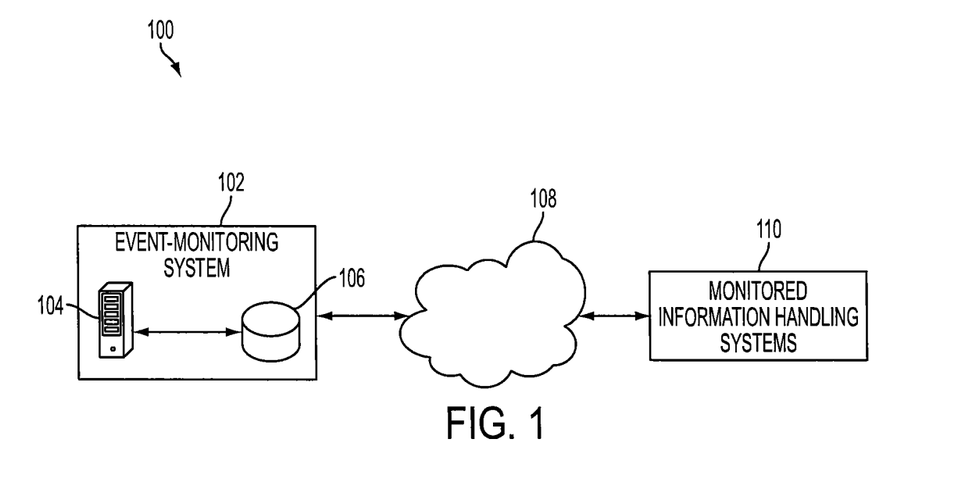
FIG. 1 illustrates a system for correlating anomalous events.

FIG. 1 illustrates a system 100 for correlating anomalous events. The system 100 includes an event-monitoring system 102 communicating with monitored information handling systems 110 over a network 108. In a typical embodiment, the event-monitoring system 102 monitors and controls the monitored information handling systems 110. For example, in various embodiments, the event-monitoring system 102 may encompass an industrial control system such as, for example, a supervisory control and data acquisition (SCADA) system or a distributed control system (DCS).

It should be appreciated that the network 108 is intended to abstract a plurality of networks over which the event-monitoring system 102 may be operable to communicate. In particular, the network 108 logically represents all communication infrastructure for connecting the event-monitoring system 102 to each of the monitored information handling systems 110. The network 108 can include any number of wired and/or wireless communications networks such as, for example, public or private intranets, the Internet, public switched telephone networks (PSTNs), cellular networks, satellite communication, and the like. To the extent a particular information handling system of the monitored information handling systems 110 connects to the event-monitoring system 102 through others of the monitored information handling systems 110, for purposes of communication between the event-monitoring system 102 and the particular information handling system, the network 108 can be considered to include those other information handling systems.

The monitored information handling systems 110 can include, for example, field devices (e.g., programmable logic controllers (PLCs)) that control or monitor local operations such as opening and closing valves and breakers, sensor systems, remote terminal units (RTUs) that connect to and gather data from sensor systems, and the like. The monitored information handling systems 110 can also include, for example, server computers, desktop computers, laptop computers, tablet computers, and smartphones. The monitored information handling systems 110 can also include networking equipment such as, for example, routers, switches, wireless access points, and the like. In various embodiments, subsets of the monitored information handling systems 110 may be interconnected. Each interconnected subset may be arranged into a network topology that has, for example, a tree structure. In this manner, some of the monitored information handling systems 110 may be effectively dependent upon others of the monitored information handling systems 110. The monitored information handling systems 110 may also be geographically dispersed on a global level.

The event-monitoring system 102 is operable to monitor, correlate, and handle anomalous events that have relevance to the monitored information handling systems 110. As described in greater detail with respect to FIG. 2, the event-monitoring system typically collects dynamic context information regarding, inter alia, one or more features of each of the monitored information handling systems 110. The features can include, for example, availability, CPU utilization, and/or other factors of interest. In various embodiments, the event-monitoring system 102 may request the dynamic context information over the network 108. In various other embodiments, the event-monitoring system 102 may receive the dynamic context information without having to transmit a request. In some embodiments, the event-monitoring system 102 may request and/or receive at least a portion of the dynamic context information according to a data-collection schedule. The data-collection schedule can be, for example, specific to each information handling system of the monitored information handling systems 110.

Figure 2:
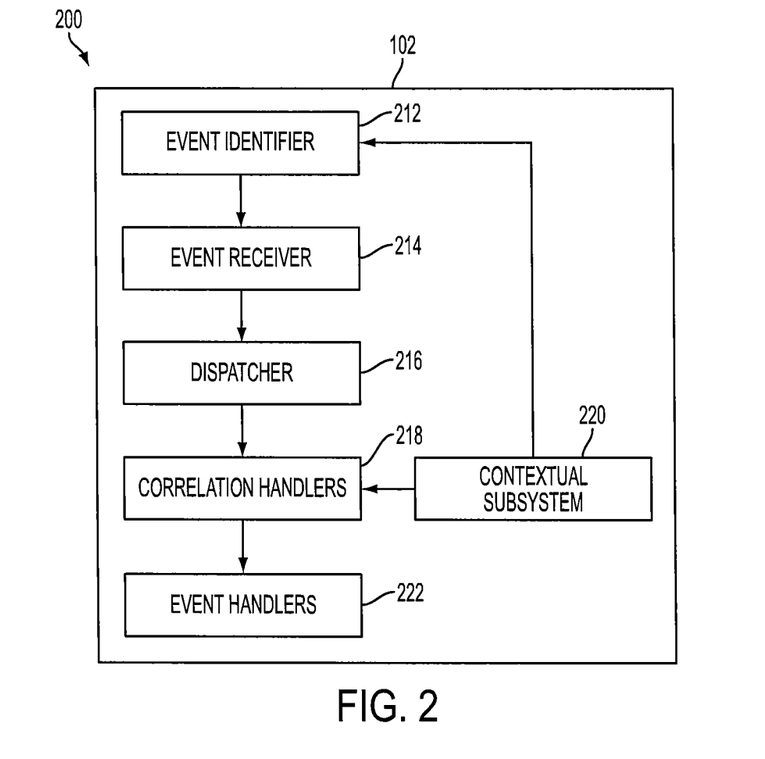
FIG. 2 illustrates an exemplary component view of the event-monitoring system of FIG. 1.

FIG. 2 illustrates an exemplary component view 200 of the event-monitoring system 102. The event-monitoring system 102 includes an event identifier 212, an event receiver 214, a dispatcher 216, a plurality of correlation handlers 218, a contextual subsystem 220, and a plurality of event handlers 222. In a typical embodiment, the event identifier 212, the event receiver 214, the dispatcher 216, the plurality of correlation handlers 218, the contextual subsystem 220, and the plurality of event handlers 222 are software components executing on the event-monitoring system 102.

In a typical embodiment, the contextual subsystem 220 is operable to provide a stream of dynamic context information to the plurality of correlation handlers 218 and to the event identifier 212. As described below, the plurality of correlation handlers 218 can leverage the dynamic context information to correlate anomalous events. In various embodiments, functionality of the contextual subsystem 220 is exposed via, for example, an application programming interface (API). In various other embodiments, the contextual subsystem 220 may be considered an abstraction of a plurality of contextual sources that are accessible to the plurality of correlation handlers 218 and the plurality of event handlers 222.

The contextual subsystem 220 typically leverages resources of the event-monitoring system 102 to produce the dynamic context information. Therefore, it should be appreciated that the contextual subsystem 220 is typically operable to provide numerous categories of context information. For example, as described in greater detail below, the dynamic context information can include any combination of weather information, geographic information, proximity information, topological information, data-collection scheduling information, user information, status information, and logged-event information. Numerous other categories of context information are also contemplated and will be apparent to one of skill in the art after reviewing the inventive principles outlined herein.

The weather information generally includes information about current weather and current weather patterns, for example, by geographic location. In various embodiments, the weather information may be received via a weather-monitoring service. The location information typically includes information indicative of a physical location of one or more of the monitored information handling systems 110. For example, in various embodiments, the location information identifies a geographic location (e.g., geographic coordinates from a global positioning system (GPS)).

The proximity information includes information identifying a geographic proximity of a monitored information handling system to a target such as, for example, another information handling system. The data-collection scheduling information can include information related to when updated data of a particular type, including other dynamic context information, can be expected. For example, the data-collection scheduling information may indicate when new topological information or availability information is expected from each of the monitored information handling systems 110.

The user information typically identifies or classifies users associated with the monitored information handling systems 110 and can include, for example, information identifying the user and a group and/or domain to which the user belongs. The status information may include any information related to a current state of a given information handling system such as, for example, the given information handling system's availability, signal-to-noise ratio, capacity, etc. The logged-event information typically includes information regarding anomalous events previously identified and/or processed by the event-monitoring system 102.

In a typical embodiment, the event identifier 212 is operable to identify anomalous events based on, for example, rules that utilize contextual variables. The anomalous events may be identified as a result of dynamic context information supplied by the contextual subsystem 220 or via another stimulus. For example, an anomalous event may be that a particular monitored information handling system of the monitored information handling systems 110 has been deemed unavailable (e.g., based on no response frame received). The event receiver 214 is operable to provide an interface for receiving events that have been identified. The dispatcher 216 manages incoming anomalous events and, as described in greater detail below, distributes the incoming anomalous events to the plurality of correlation handlers 218. In some embodiments, the dispatcher 216 may implement a pipeline software pattern.

In a typical embodiment, the plurality of correlation handlers 218 are collectively operable to resolve an appropriate composite event, if any, for a given anomalous event. Therefore, each correlation handler of the plurality of correlation handlers 218 typically includes logic for correlating the given anomalous event to other anomalous events, to dynamic context information for the monitored information handling systems, and/or to other items of relevance. In various embodiments, the plurality of correlation handlers 218 can use any one of many correlation algorithms and each correlation handler need not use a same type of correlation algorithm.

For example, in various embodiments, particular correlation handlers of the plurality of correlation handlers 218 may employ rule-based correlation algorithms. In these embodiments, rules may be established that correlate based on contextual variables. The rules can be established by administrators or other parties. In a typical embodiment, each rule includes a Boolean expression and a potential correlation that is dependent upon whether the Boolean expression evaluates to true or false. For example, the Boolean expression for each rule can specify absolute values and/or ranges of values for each of one or more contextual variables. The values and/or ranges of values can be connected by Boolean operators such as, for example, AND, OR, and NOT. For example, rules could be established that identify composite events for particular types of anomalous events involving information handling systems that are related in a particular way (e.g., a parent-child relationship in a network topology).

By way of further example, in various embodiments, particular correlation handlers of the plurality of correlation handlers 218 may employ a machine-learning algorithm such as pattern recognition, clustering, and decision-tree learning. In these embodiments, the plurality of correlation handlers 218 can be trained to classify anomalous events based on dynamic context information and to better distinguish between different composite events. In addition, in various embodiments, particular correlation handlers of the plurality of correlation handlers 218 may employ a scoring model such that, for example, particular contextual variables can be mathematically operated upon and combined to yield a score that is compared to a threshold.

In various embodiments, the plurality of correlation handlers 218 can correlate for purposes of message-storm prevention. In various embodiments, the plurality of correlation handlers 218 can also correlate for purposes of issuing proactive alerts. In the proactive aspect, the plurality of correlation handlers 218 are operable to receive external events such as, for example, anomalous weather events, and to correlate the external events to dynamic context information related to particular information handling systems (e.g., geographic information) for purposes of identifying any composite event. In the message-storm prevention aspect, the plurality of correlation handlers 218 are operable to receive an anomalous event related to a particular monitored information handling system and to attempt to infer a root cause. If a root cause is inferred, a composite event is generally created. In various embodiments, the plurality of correlation handlers 218 can thereby reduce or prevent message storms. The root cause can be, for example, weather, a parent node in a network topology, or the like.

In a typical embodiment, the plurality of event handlers 222 are operable to handle both composite events and individual anomalous events and to issue alerts to appropriate individuals and/or groups of individuals. In various embodiments, each of the plurality of event handlers 222 may be operable to handle a particular type of composite event or anomalous event. A particular type of composite event or anomalous event may be identified, for example, by an identifier for the type and/or an identifier for the particular event. In certain embodiments, particular event handlers of the plurality of event handlers 222 may be associated with particular correlation handlers of the plurality of correlation handlers 218. In these embodiments, the particular event handlers may receive events from particular correlation handlers. In this fashion, alerts can be made specific by indicating any inferred root cause. Alerts can also be targeted to a set of individuals who should be notified of the composite event regardless of whether those individuals would have been notified of any individual anomalous event. In addition, redundant alerts such as, for example, message storms, can be reduced or eliminated.

In operation, the event identifier 212 passes an anomalous event to the event receiver 214. The event receiver 214 receives the anomalous event and passes the anomalous event to the dispatcher 216. As described above, the dispatcher 216 manages incoming anomalous events. In various embodiments, each of the plurality of correlation handlers 218 may address a particular type of composite event. Also, some correlation handlers of the plurality of correlation handlers 218 may address a same type of composite event. Therefore, the dispatcher 216 distributes the anomalous event to an appropriate sequence of correlation handlers of the plurality of correlation handlers 218. The sequence may be, for example, a priority order in which composite events should be identified. The sequence can also be defined in other ways. It should be appreciated that, in some embodiments, it may be allowed to have more than one composite event identified since it may be possible that there is more than one root cause for a given anomalous event.

After the plurality of correlation handlers 218 have attempted to correlate the anomalous event, any composite events (or the anomalous event) are passed to one or more appropriate event handlers of the plurality of event handlers 222. As described above, the one or more appropriate event handlers may issue an alert to appropriate individuals or groups of individuals. In various embodiments, separation of correlation logic, event-handling logic, and event-identification logic as described above allows for smoother event identification and event handling. Both the event identifier 212 and the plurality of event handlers 222 can operate unclouded by knowledge of, for example, dependency relationships among the monitored information handling systems 110.

Figure 3:
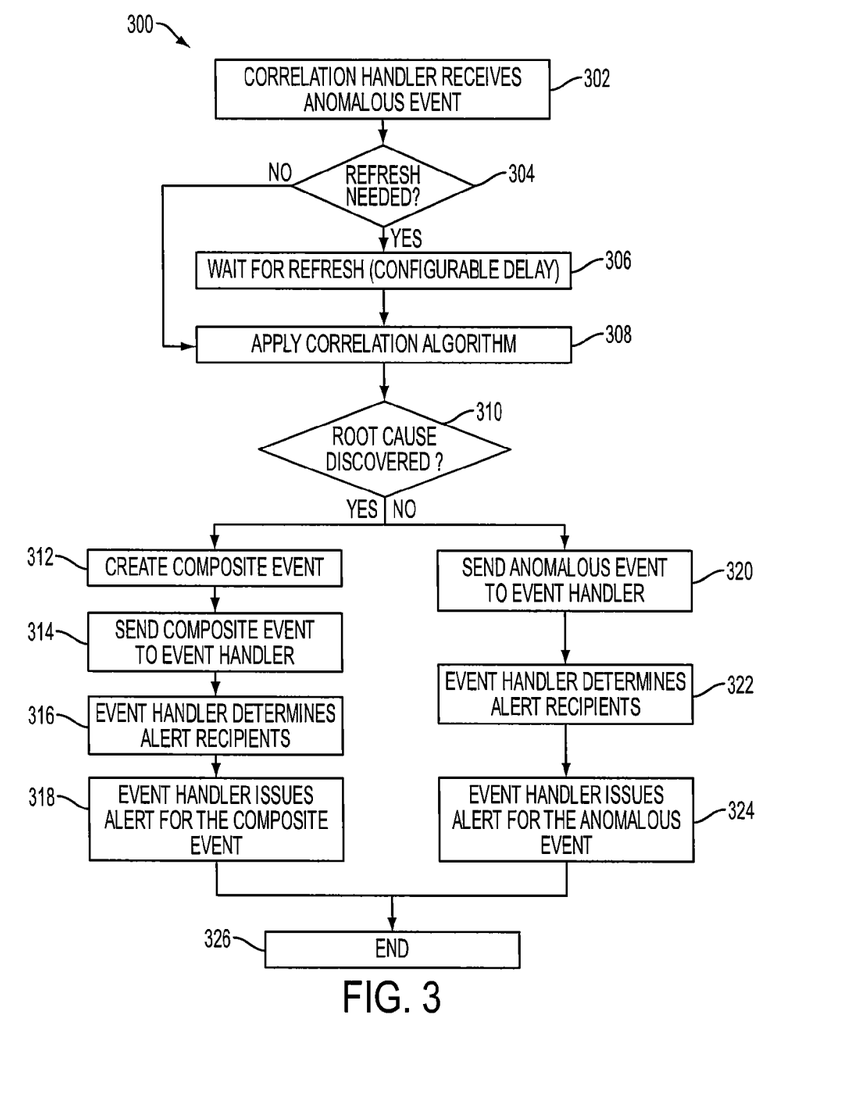
FIG. 3 illustrates an example of a process that may be executed via a correlation handler and an event handler.

FIG. 3 illustrates an example of a process 300 that may be executed via a correlation handler and an event handler resident on an event-handling system. The process 300 is illustrative of a manner by which message storms can be prevented. The correlation handler, the event handler, and the event-handling system may operate as described, for example, with respect to the plurality of correlation handlers 218, the plurality of event handlers 222, and the event-handling system 102, respectively. The process 300 begins at step 302.

At step 302, the correlation handler receives an anomalous event. The anomalous event has typically been identified as described, for example, with respect to FIG. 2. From step 302, the process 300 proceeds to step 304. At step 304, the correlation handler determines whether any data refresh is needed before performing a correlation algorithm. In a typical embodiment, the correlation makes the determination with respect to monitored information handling systems that are within a correlation scope of the anomalous event. That is, the information handling system determines whether there are any monitored information handling systems that could potentially contribute to a composite event being identified relative to the anomalous event but whose dynamic context information is deemed out of date. The correlation scope may be based on, for example, topological dependency, physical dependency, logical dependency (e.g., a common control system), geographic relationships, etc. In a typical embodiment, if the correlation handler determines that any data refresh is needed, the process 300 proceeds to step 306.

At step 306, the correlation handler waits for updated data from any information handling systems whose dynamic context information is deemed out of date. In a typical embodiment, a length of the wait is a configurable delay based on, for example, a data-collection schedule that specifies when or at what frequency updated data is expected. In some embodiments, the correlation handler may affirmatively request the data refresh from those information handling systems. In a typical embodiment, the configurable delay allows the correlation handler to anticipate the possibility that other anomalous events may soon be received.

Moreover, the configurable delay addresses a problem that anomalous events are often received out of order. In particular, a first information handling system may be directly dependent upon another information handling system, higher in a topology structure, that has experienced a failure. However, based on the data-collection schedule, the anomalous event pertaining to the first information handling system may be identified before the anomalous event is identified for the second information handling system. The configurable delay, however, alleviates this problem because the configurable delay is tailored to ensure that up-to-date dynamic context information is received for information handling systems within the correlation scope. From step 306, the process 300 proceeds to step 308.

At step 308, the correlation handler applies the correlation algorithm. In a typical embodiment, the correlation algorithm attempts to identify a root cause of a particular type for which the correlation handler is configured. The correlation handler typically examines relationships among the monitored information handling systems within the correlation scope. In various embodiments, the correlation handler may examine topological dependencies. For example, based on topological dependencies, it may be determined that an information handling system higher than an information handling system from which the anomalous event originated is the root cause of the anomalous event. In such cases, an outage on the higher information handling system may be appropriately identified as the root cause.

In various embodiments, the correlation handler may examine and correlate, for example, geographic relationships among the monitored information handling systems. The geographic relationships can be inferred via geographic information provided as part of dynamic context information from a contextual subsystem such as, for example, the contextual subsystem 220 of FIG. 2. Therefore, the anomalous event (e.g. an outage on a particular monitored information handling system) can be correlated with other anomalous events (e.g., other outages) occurring within a configurable geographic area. In such cases, a geographic issue may be appropriately identified as the root cause.

Continuing the above example, in some embodiments, the correlation handler may examine weather information in addition to the geographic relationships. The weather information is typically also received as part of the dynamic context information. In this fashion, the correlation handler can correlate a weather event such as a storm with the configurable geographic area. In such cases, the weather event may be appropriately identified as the root cause of outages in the configurable geographic area.

In addition, the correlation handler can examine logged-event information that is provided, for example, as part of the dynamic context information. The logged-event information typically includes information about previous anomalous events that have been processed by the event-monitoring system. Oftentimes, it may not be possible to identify a root cause based on limited information available at a given time. For example, early anomalous events (e.g., the first anomalous event) related to a weather event as described above may not be able to be properly correlated at the time of identification. The correlation handler, however, is typically operable to analyze the previous anomalous events as part of its functionality. Consequently, as sufficient information becomes available via, for example, additional anomalous events or additional weather information, the correlation handler can appropriately correlate the early anomalous events with the additional anomalous events and with any weather events. In this manner, root causes can be identified with respect to the anomalous event and the previous anomalous events as necessary. From step 308, the process 300 proceeds to step 310.

At step 310, the correlation handler determines whether a root cause has been identified. If so, the process proceeds to step 312. At step 312, a composite event is created. The composite event may have an identifier for its type (i.e., root cause) and/or an identifier that specifically identifies the composite event among all other events. The composite event may also identify individual anomalous events subsumed therein. From step 312, the process 300 proceeds to step 314. At step 314, the correlation handler sends the composite event to an event handler. From step 314, the process 300 proceeds to step 316.

At step 316, the event handler determines recipients for an alert concerning the composite event. From step 316, the process 300 proceeds to step 318. At step 318, the event handler issues the alert for the composite event. In cases where the composite event includes anomalous events previously processed by the event-monitoring system, the issuing of the alert may include issuing an update to any previous alerts that were issued. For example, the update may specifically identify the root cause. From step 318, the process 300 proceeds to step 326. At step 326, the process 300 ends.

If it is determined at step 310 that no root cause has been identified, the process 300 proceeds to step 320. At step 320, the correlation handler sends the anomalous event to an event handler for handling as an individual anomalous event. From step 320, the process 300 proceeds to step 322. At step 322, the event handler determines recipients for the alert concerning the anomalous event. From step 322, the process 300 proceeds to step 324. At step 324, the event handler issues the alert for the anomalous event. From step 324, the process 300 proceeds to step 326 and ends.

Figure 4:
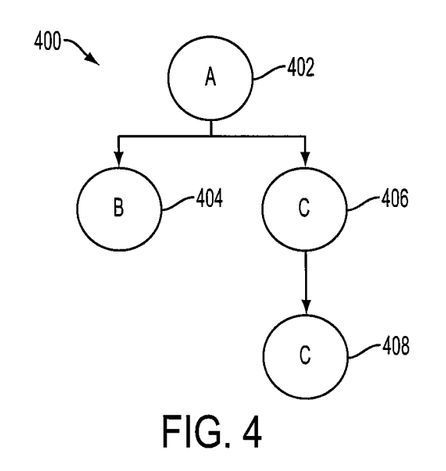
FIG. 4 illustrates an exemplary network topology.

FIG. 4 illustrates an exemplary network topology 400. The network topology 400 includes information handling systems 402, 404, 406, and 408. In the topology 400, a correlation handler such as, for example, one of the plurality of correlation handlers 218 of FIG. 2, may recognize that an outage event on the information handling system 408 is actually related to its ancestors (i.e., the information handling systems 402 and 406). In this case, the correlation handler can examine a data-collection schedule as described above in order to determine that dynamic context information for the information handling system 402 needs to be refreshed. The correlation handler can then delay processing a correlation algorithm until the dynamic context information for the information handling system 402 is updated.

Once the dynamic context information for the information handling system 402 has been updated, it may be determined that the information handling system 402 is also experiencing an outage event. In this case, the outage event on the information handling system 402 is a root cause of the outage event on the information handling system 408. In response, the correlation handler can create a composite event that identifies the root cause and an observed impact (i.e., the information handling systems 406 and 408). The correlation handler can send the composite event to an event handler for handling and issuing of an appropriate alert as described above.

Figure 5:
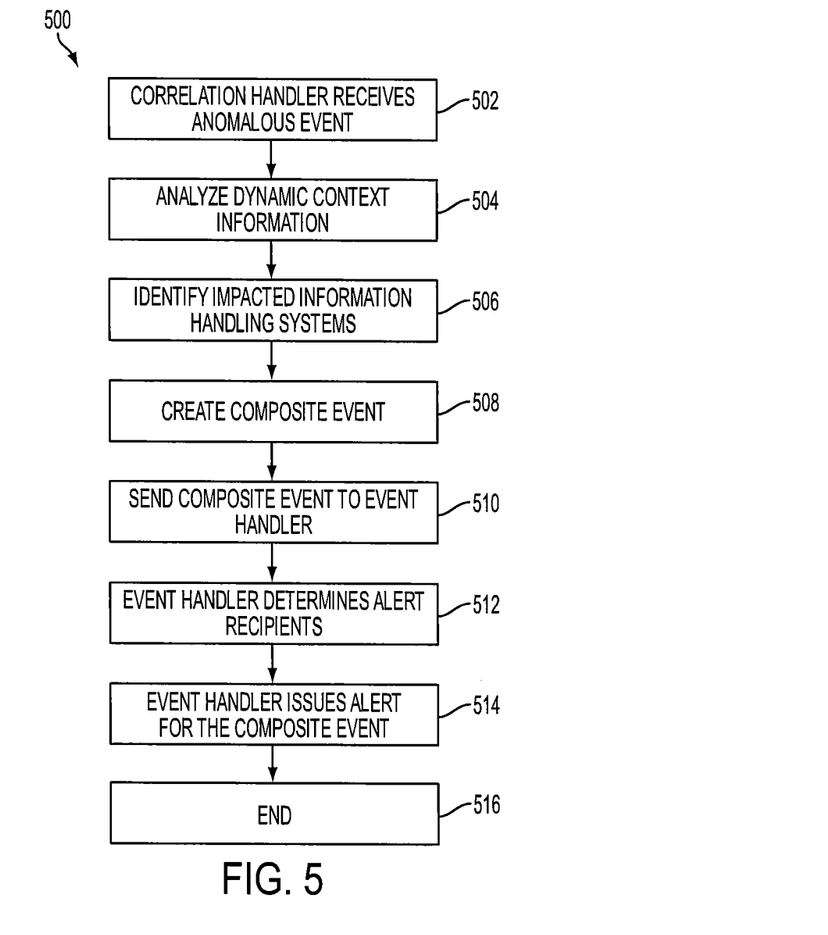
FIG. 5 illustrates an example of a process that may be executed via a correlation handler and an event handler.

FIG. 5 illustrates an example of a process 500 that may be executed via a correlation handler and an event handler resident on an event-handling system. The process 500 is illustrative of a manner by which proactive alerts for composite events can be issued. The correlation handler, the event handler, and the event-handling system may operate as described, for example, with respect to the plurality of correlation handlers 218, the plurality of event handlers 222, and the event-handling system 102, respectively. The process 500 begins at step 502.

At step 502, the correlation handler receives an anomalous event such as, for example, an anomalous weather event. The anomalous event may be, for example, a storm that affects wireless-transmission ability or other functionality of information handling systems in a certain geographic area. The anomalous event has typically been identified as described, for example, with respect to FIG. 2. From step 502, the process 500 proceeds to step 504. At step 504, the correlation handler analyzes dynamic context information provided by a contextual subsystem such as, for example, the contextual subsystem 220 of FIG. 2. For example, if the anomalous event is an anomalous weather event such as a storm, the correlation handler may predict and analyze a projected path of the storm. From step 504, the process 500 proceeds to step 506.

At step 506, based on the analysis, the correlation handler identifies any monitored information handling systems that are impacted by the anomalous event. For example, with respect to the anomalous weather event, the impacted information handling systems may be those information handling systems located in the certain geographic area. By way of further example, the impacted information handling systems may include those information handling systems that are in the projected path of the storm. It should be appreciated that the impacted information handling systems are often mobile. Therefore, the identification at step 504 is typically performed dynamically. From step 506, the process 500 proceeds to step 508.

At step 508, the correlation handler creates a composite event according to the impacted information handling systems. For example, the composite event may be considered a proactive composite event regarding the anomalous weather event. From step 508, the process 500 proceeds to step 510. At step 510, the correlation handler sends the composite event to an event handler. From step 510, the process 500 proceeds to step 512. At step 512, the event handler determines appropriate recipients for an alert concerning the composite event. From step 512, the process 500 proceeds to step 514. At step 514, the event handler issues the alert for the composite event. The alert may be, for example, a weather advisory. In a typical embodiment, the alert ensures that appropriate preparation can occur such as, for example, setting up alternative equipment to manage an outage on the impacted information handling systems. It should be appreciated that the ability to prepare can be particularly important in critical-control environments such as power generation. From step 514, the process 500 proceeds to step 516. At step 516, the process 500 ends.

It should be appreciated that a process such as, for example, the process 300 of FIG. 2 or the process 500 of FIG. 5, may be performed with respect to numerous types of anomalous events. For example, a correlation handler may observe events associated to busses that appear to be stopped (e.g., via stationary GPS coordinates) on a certain road or highway. In such a case, the correlation handler may identify a blockage event (a composite event). Subsequently, an event handler may issue a warning event to inbound busses and suggest an alternate route.

Other types of composite events can also be identified and handled such as, for example, login-failures on several monitored information handling systems within a short period of time (intrusion-attempt composite event), login-failures with a same set of credentials on several monitored information handling systems (invalid-credential composite event), and the like. Numerous other types of composite events will be apparent to one of ordinary skill in the art after reviewing the inventive principles contained herein.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   monitoring, by an event-monitoring system comprising computer hardware, a plurality of information handling systems;
   receiving an anomalous event with respect to at least one information handling system of the plurality of information handling systems;
   analyzing, by the event-monitoring system via a correlation handler, the anomalous event for root cause before passing the anomalous event to an event handler for alert issuance, the analyzing comprising:
      determining based, at least in part, on a data-collection schedule, that at least one data refresh is needed with respect to one or more monitored information handling systems within a correlation scope of the at least one information handling system;
      delaying anomalous-event correlation relating to the anomalous event so that the at least one data refresh can be executed;
      receiving at least one additional anomalous event responsive to the at least one data refresh;
      performing, via at least one correlation handler on the event-monitoring system, at least one correlation algorithm on the anomalous event;
      responsive to the performing, determining whether a common root cause for the anomalous event and the at least one additional anomalous event has been identified;
      responsive to a determination that a common root cause has been identified, creating, by the event-monitoring system via the correlation handler, at least one composite event;
      wherein the at least one composite event comprises a plurality of anomalous events deemed to have a common root cause, the plurality of anomalous events comprising the anomalous event and the at least one additional anomalous event;
   sending the at least one composite event to an event handler; and
   issuing, by the event-monitoring system via the event handler, an alert for the at least one composite event, thereby facilitating message-storm prevention relating to the plurality of anomalous events.

2. The method of claim 1, wherein the correlation handler and the event handler are logically separate software components.

3. The method of claim 1, wherein the performing comprises examining logged-event information for previous anomalous events that have been processed by the event-monitoring system.

4. The method of claim 1, the delaying comprising waiting a configurable delay for the at least one data refresh.

5. The method of claim 1, the delaying comprising requesting the at least one data refresh from an information handling system for which the at least one data refresh is needed.

6. The method of claim 1, wherein the performing comprises identifying a root cause for the anomalous event.

7. The method of claim 6, wherein the root cause is selected from the group consisting of: a weather event, an outage event on a particular information handling system, and a geographic issue.

8. The method of claim 1, wherein the performing comprises:
   examining geographic relationships among the plurality of information handling systems; and
   correlating the anomalous event with other anomalous events in a geographic area.

9. The method of claim 8, wherein the performing comprises:
   correlating the anomalous event and the other anomalous events with a weather event; and
   identifying the weather event as a root cause of the anomalous event and of the other anomalous events.

10. The method of claim 1, wherein:
    the performing comprises:
       analyzing dynamic context information for the plurality of information handling systems; and
       with respect to the anomalous event, identifying impacted information handling systems of the plurality of information handling systems; and
    the at least one composite event comprises a proactive composite event.

11. The method of claim 10, wherein:
    the anomalous event comprises a weather event; and
    the analyzing comprises determining a projected path of the weather event.

12. The method of claim 1, wherein the anomalous event is selected from the group consisting of: weather event, outage event, and log-in failure event.

13. An information handling system comprising computer hardware, wherein the information handling is operable to perform a method comprising:
    monitoring a plurality of information handling systems;
    receiving an anomalous event with respect to at least one information handling system of the plurality of information handling systems;
    analyzing, via a correlation handler, the anomalous event for root cause before passing the anomalous event to an event handler for alert issuance, the analyzing comprising:
       determining based, at least in part, on a data-collection schedule, that at least one data refresh is needed with respect to one or more monitored information handling systems within a correlation scope of the at least one information handling system;
       delaying anomalous-event correlation relating to the anomalous event so that the at least one data refresh can be executed;
       receiving at least one additional anomalous event responsive to the at least one data refresh;

performing, via the correlation handler, at least one correlation algorithm on the anomalous event;

responsive to the performing, determining whether a common root cause for the anomalous event and the at least one additional anomalous event has been identified;

responsive to a determination that a common root cause has been identified, creating, via the correlation handler, at least one composite event;

wherein the at least one composite event comprises a plurality of anomalous events deemed to have a common root cause, the plurality of anomalous events comprising the anomalous event and the at least one additional anomalous event;

sending the at least one composite event to an event handler; and issuing, via the event handler, an alert for the at least one composite event, thereby facilitating message-storm prevention relating to the plurality of anomalous events.

14. The information handling system of claim 13, wherein the correlation handler and the event handler are logically separate software components.

15. The information handling system of claim 13, wherein the performing comprises examining logged-event information for previous anomalous events that have been processed by the information handling system.

16. The information handling system of claim 13, the delaying comprising waiting a configurable delay for the at least one data refresh.

17. The information handling system of claim 13, the delaying comprising requesting the at least one data refresh from an information handling system for which the at least one data refresh is needed.

18. The information handling system of claim 13, wherein the performing comprises identifying a root cause for the anomalous event.

19. The information handling system of claim 13, wherein:
the performing comprises:
    analyzing dynamic context information for the plurality of information handling systems; and
    with respect to the anomalous event, identifying impacted information handling systems of the plurality of information handling systems; and
the at least one composite event comprises a proactive composite event.

20. A computer-program product comprising a non-transitory computer-usable medium having computer-readable program code embodied therein, the computer-readable program code adapted to be executed to implement a method comprising:
monitoring, by an event-monitoring system, a plurality of information handling systems;

receiving an anomalous event with respect to at least one information handling system of the plurality of information handling systems;

analyzing, by the event-monitoring system via a correlation handler, the anomalous event for root cause before passing the anomalous event to an event handler for alert issuance, the analyzing comprising:
    determining based, at least in part, on a data-collection schedule, that at least one data refresh is needed with respect to one or more monitored information handling systems within a correlation scope of the at least one information handling system;
    delaying anomalous-event correlation relating to the anomalous event so that the at least one data refresh can be executed;
    receiving at least one additional anomalous event responsive to the at least one data refresh;
    performing, via at least one correlation handler on the event-monitoring system, at least one correlation algorithm on the anomalous event;
    responsive to the performing, determining whether a common root cause for the anomalous event and the at least one additional anomalous event has been identified;
    responsive to a determination that a common root cause has been identified, creating, by the event-monitoring system via the correlation handler, at least one composite event;
    wherein the at least one composite event comprises a plurality of anomalous events deemed to have a common root cause, the plurality of anomalous events comprising the anomalous event and the at least one additional anomalous event;

sending the at least one composite event to an event handler; and issuing, via the event handler, an alert for the at least one composite event, thereby facilitating message-storm prevention relating to the plurality of anomalous events.

\* \* \* \* \*